United States Patent [19]
Ejnik

[11] Patent Number: 5,985,347
[45] Date of Patent: Nov. 16, 1999

[54] CHEESE PROCESSING VAT AND METHOD

[75] Inventor: Stephen J. Ejnik, Eldorado, Wis.

[73] Assignee: Damrow Company, Inc., Fond du Lac, Wis.

[21] Appl. No.: 09/047,708

[22] Filed: Mar. 25, 1998

[51] Int. Cl.[6] .............................. A01J 25/00; B01F 7/00
[52] U.S. Cl. ........................ 426/519; 99/462; 99/466; 241/98; 241/101.1; 366/297; 366/300; 366/325.1; 426/582
[58] Field of Search .................... 426/519, 582, 426/583; 99/453, 462, 466; 366/297, 300, 301, 325.1; 241/98, 101.1, 199.12

[56] References Cited

U.S. PATENT DOCUMENTS

| | | | |
|---|---|---|---|
| 3,858,855 | 1/1975 | Hazen | 99/462 |
| 3,988,011 | 10/1976 | Kressin | 99/462 |
| 4,108,058 | 8/1978 | Sjoholm et al. | 99/466 |
| 4,206,880 | 6/1980 | Stanton | 99/462 |
| 4,938,424 | 7/1990 | Pittelko | 241/98 |
| 4,989,504 | 2/1991 | Jay | 99/455 |
| 5,178,060 | 1/1993 | Rusch et al. | 99/462 |
| 5,513,559 | 5/1996 | Jay | 99/455 |
| 5,606,907 | 3/1997 | Jay | 99/455 |

*Primary Examiner*—George Yeung
*Attorney, Agent, or Firm*—Andrus, Seales, Starke & Sawall

[57] ABSTRACT

A cheese processing vat of the type having a pair of interconnected generally cylindrical wall portions with agitator panels rotating therein to sweep generally cylindrical volumes includes agitator panels which are driven to rotate in opposite directions such that the panels move through a common swept volume between their axes of rotation in the same direction. The panels are mounted such that one panel leads the other during movement through the common swept volume.

12 Claims, 2 Drawing Sheets

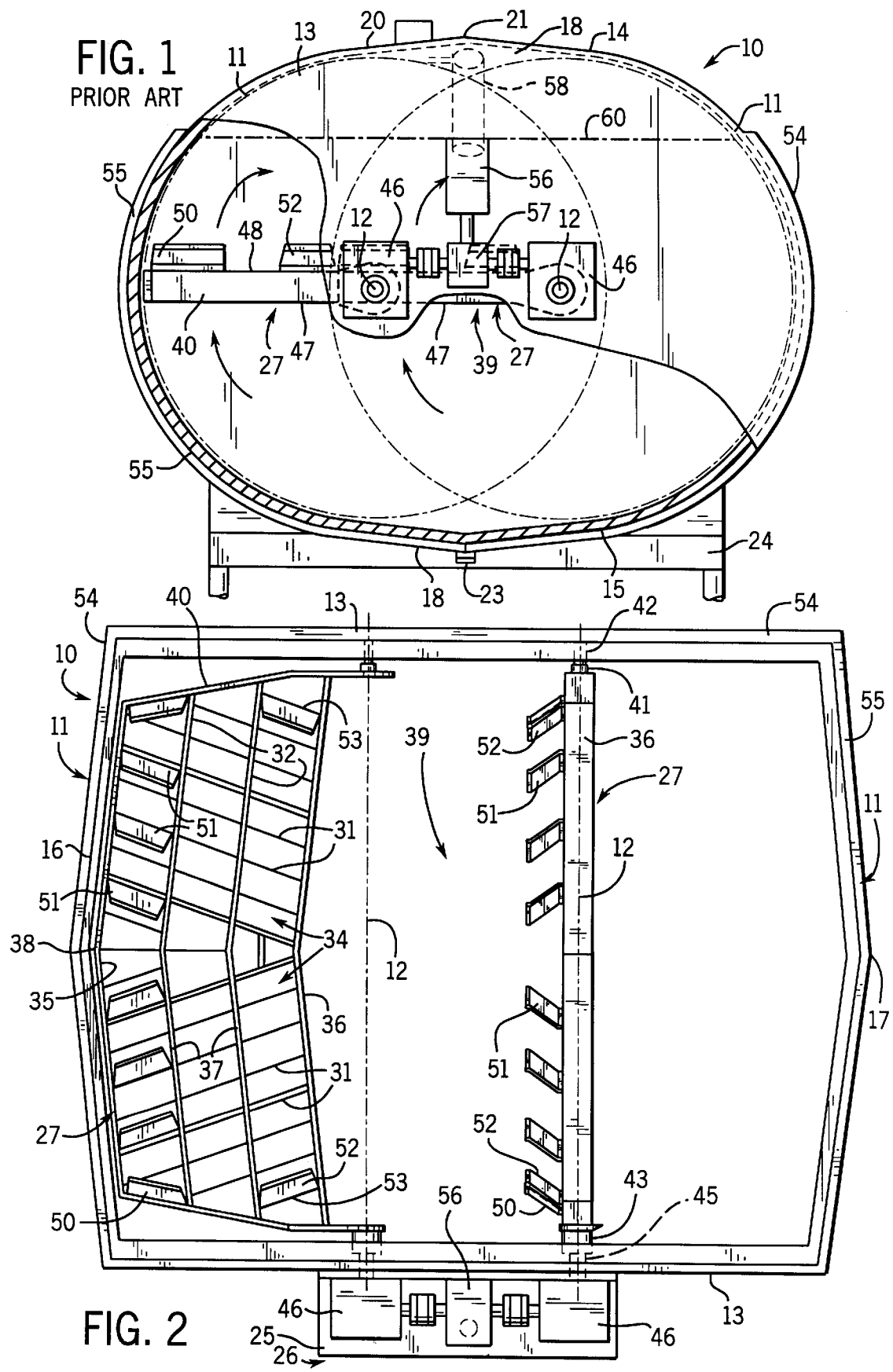

CHEESE PROCESSING VAT AND METHOD

BACKGROUND OF THE INVENTION

The present invention relates generally to the field of food processing and related food processing equipment and, more particularly, to the processing of semi-liquid food products, such as cheese. The cheese processing vat of the present invention and the method by which it operates preferably utilize a closed vessel in which generally cylindrical wall portions are oriented horizontally and enclosed with common end walls, the generally cylindrical wall sections having rotatable agitators which are mounted to sweep a common volume therebetween.

The use of totally enclosed processing vats, for the manufacture of many types of cheese and similar semi-liquid food products, is well known in the art. U.S. Pat. Nos. 3,858,855; 4,206,880; 4,938,424 and 5,178,060 are examples of prior art cheese making vats that are fully enclosed. The vats in each of these patents use agitator means, for both cutting the coagulum and stirring, that are vertically disposed within a vessel comprised of two partial cylinders. This design is very effective for smaller vessels but becomes less efficient with increases in size due to the need to create vertical movement within the vat contents without damagingly high peripheral agitator speeds. In the patents cited above, vertical movement is induced by means of hinged deflector plates which cause maximum turbulence when the agitator is rotated in the stirring direction while maintaining a highly streamlined configuration when the agitator is rotated in the cutting direction.

U.S. Pat. No. 4,108,058 discloses a fully enclosed cheese making vat in the form of a horizontal cylindrical vessel with a single horizontal shaft carrying the combined cutting and stirring paddles. The construction of the agitator paddle results in less damage to the food product and, in the case of cheese, results in minimum release of butterfat and cheese fines into the whey. A major disadvantage of this design is that the whole contents of the vat tend to rotate during cutting and in effect move away from the knife blades. This, together with a very high velocity gradient between the agitator blades near to the shaft and those on the periphery, makes it very difficult to achieve an evenly cut coagulum and can cause problems of product variability.

U.S. Pat. No. 4,989,504 describes a fully enclosed cheese making vat in the form of a plurality of horizontally arranged partial cylindrical sections each with a separate shaft-mounted agitator, such that the distance between agitator shafts is greater than the radius of the swept volume created by the rotation of the agitator. This arrangement is an improvement over the single shaft horizontal vat with regard to rotation of the vat contents during cutting, but the problem of velocity gradient between the agitator paddle near to the shaft and that at the periphery is only slightly reduced. The low agitator speeds that are typically used with this type of cheese vat give rise to very poor agitation adjacent to the agitator shaft and can also cause a significant problem with product congealing around the shaft. The vat construction described in the above U.S. Pat. No. 4,989,504 includes an agitator comprising a series of individual paddles attached to the shafts in staggered rows or in a row wrapped spirally around the shafts. A resultant problem with this arrangement is the extreme difficulty encountered when entering the vat for maintenance or hand cleaning due to the impossibility of parking the agitator paddles in a position that allows easy and safe movement around the inside of the vat.

In U.S. Pat. Nos. 5,513,559 and 5,606,907, the horizontal axis of each agitator is disposed centrally within each wall portion, the distance between the axes being smaller than the radius of the swept volume created by rotation of the agitator so that a common portion of the swept volume for each axis intersects and overlaps the swept volume of the adjacent axis. The overall agitation pattern is such that the contents of the vat will be induced to rotate in the same direction as the agitator with the contents subjected to significant cross-cutting action and other interactions in the zone where the agitator panels overlap.

Notwithstanding the advantages in the construction and operation of horizontal vats, particularly those utilizing two or more horizontally arranged partial cylindrical sections with agitators that overlap as they rotate through a common volume between the agitators, operational deficiencies remain. It is believed that one of the main operational problems in compound horizontal cheese vats results from the attempt to utilize the prior vertical vat technology without essential change. In other words, the success in the cheese industry of the double cylindrical wall vertical vat of U.S. Pat. No. 4,938,424 led subsequent innovators to attempt simply to turn that vat on its side and operate it in a horizontal mode. Thus, dual agitator horizontal vats of the types described above all utilize agitators which rotate in the same direction, such that one agitator rotates through a common chamber volume between agitators in one direction while the following agitator rotates through that space in the opposite direction. It was assumed that the processing improvements, both in stirring and cutting, provided by the double vertical vat constructions would automatically occur in similar vat constructions which were horizontally oriented.

Actual experience has not supported the foregoing assumption. Thus, in horizontal vats having two generally cylindrical outer wall portions oriented side-by-side and interconnected to provide a common center volume, driving the agitator panels in the same rotational direction (both for stirring and cutting), though providing benefits in increased capacity, uniformity of the cheese product, and somewhat reduced power requirements, deficiencies still remain. In particular, rotation of the agitator panels in the same direction, causing a bulk flow of the curds and whey generally around the walls of the vat, has been thought to be necessary for adequate temperature control and mixing. What typically occurs, however, is that the curds tend to pile up on the side of the vat where the agitator panel is moving upwardly. Curd motion tends to slow and stop and the curds start to undesirably mat together, unless additional mechanical energy is applied, such as increasing the speed of agitator rotation. Such increased velocity tends to over-agitate the cheese, causing solids loss of cheese particles into the whey. Such action is directly contrary to the desirable goal of keeping the cheese curds in suspension and evenly distributed at the lowest rpm. The agitator panel on the side of the vat providing the lift is overworked while the opposite agitator panel is under utilized. This often requires periodic reversal of the agitator to help move the curd to the other side. Such reverse movement is very inefficient because the cutting blades are used rather than the stirring edges and, in addition, the blade cause undesirable additional cutting of the curd and bleeding of whey therefrom.

SUMMARY OF THE INVENTION

In accordance with the present invention, all of the foregoing problems associated with operation of a horizontal cheese vat having a pair of interconnected generally cylindrical wall portions in which agitator panels are rotatably mounted to sweep a common overlapping volume between the rotational axes, have been eliminated. An agitator panel drive is provided which rotates the panels in opposite directions such that the panels move through the common volume between the rotational axes of the panels in the same direction. The panels are mounted such that one of the panels trails the other during movement through the common volume.

Each agitator panel includes a conventional cutting face having a plurality of sharp cutting edges and an opposite stirring face having a plurality of blunt stirring edges. By utilizing a drive which provides counterrotation of the agitator panels, and by selectively mounting the panels for rotation such that either the stirring faces or cutting faces of the panels lead in a particular direction of movement through the common volume, a stirring/cutting regime may be selected that is particularly suited to the cheese product being processed. For example, the density of the curds versus the whey varies considerably depending on the fat content of the cheese. Lower fat cheeses typically have a curd density which is greater than the density of the whey (i.e. a curd density greater than 1.0). On the other hand, high fat cheeses (such as blue cheese) will have a curd density less than 1.0. High density curds may be better processed by stirring with the agitator panels moving upwardly through the common volume, whereas cheese curds with a density less than 1.0 may be better stirred by a panel mounting in which the stirring faces move downwardly through the common volume. Similar strategies may be applied with respect to panel orientation for cutting. In any event, these strategies are unavailable in prior art vats in which the agitator panels are rotated in the same direction.

One type of horizontal vat which is particularly well suited for use with a drive to rotate the agitator panels in opposite directions includes agitator panels which comprise a framework of intersecting blades including parallel generally radially extending blades and parallel generally axially extending blades, where the radially and axially extending blades are respectively non-perpendicular. The blades are preferably generally flat plates, each including a cutting edge and an opposite stirring edge. Selected blades may include deflector plates which extend from the stirring edges of the blades. The deflector plates typically include face portions which lie in planes disposed at acute angles with respect to the planes of the blades. Preferably, the axes of rotation of the panels are spaced at a distance less than the radius of the volumes swept by the panels such that a radially outer edge portion of one panel passes during rotation through the common volume into and through the space between a radially inner edge portion of the other panel and the axis of rotation of that other panel.

In accordance with the preferred embodiment, one agitator panel is mounted to rotationally trail the other panel by about 90°. However, the panel may be mounted to rotationally trail the other panel by any angle which provided sufficient clearance to avoid agitator collision, up to about 180°.

The present invention includes a method for processing cheese in a vat of the type having a pair of interconnected generally cylindrical wall portions with horizontally disposed axes, which axes are positioned in parallel horizontally spaced relation, and common opposite end walls which form, with the cylindrical wall portions, an enclosed vat having a generally oval cross-section. The method comprises the steps of rotatably mounting an open-framed agitator panel on the axis of each wall portion to sweep a generally cylindrical volume, spacing the axes of rotation of the panels to provide a common volume between said axes; driving the panels in opposite rotational directions and causing the panels to move through said common volume in the same direction; and, causing one of the panels to trail the other during movement through the common volume. The preferred method also includes the steps of providing each panel with a cutting face having a plurality of sharp cutting edges and an opposite stirring face having a plurality of blunt stirring edges; and mounting the panels to present the respective stirring faces in one direction of movement through said common volume and to present the respective cutting faces in the opposite direction of movement through said common volume.

BRIEF DESCRIPTION OF THE DRAWINGS

FIG. 1 is an end elevation of a cheese processing vat of a type which may be used in practicing the present invention with a portion of one end wall broken away to show the agitator panels mounted and rotationally oriented in accordance with the prior art.

FIG. 2 is a horizontal sectional view through the processing vat shown in FIG. 1 and showing the agitator panels mounted and rotationally oriented in accordance with a preferred embodiment of the present invention.

DETAILED DESCRIPTION OF THE PREFERRED EMBODIMENT

Figure 3:
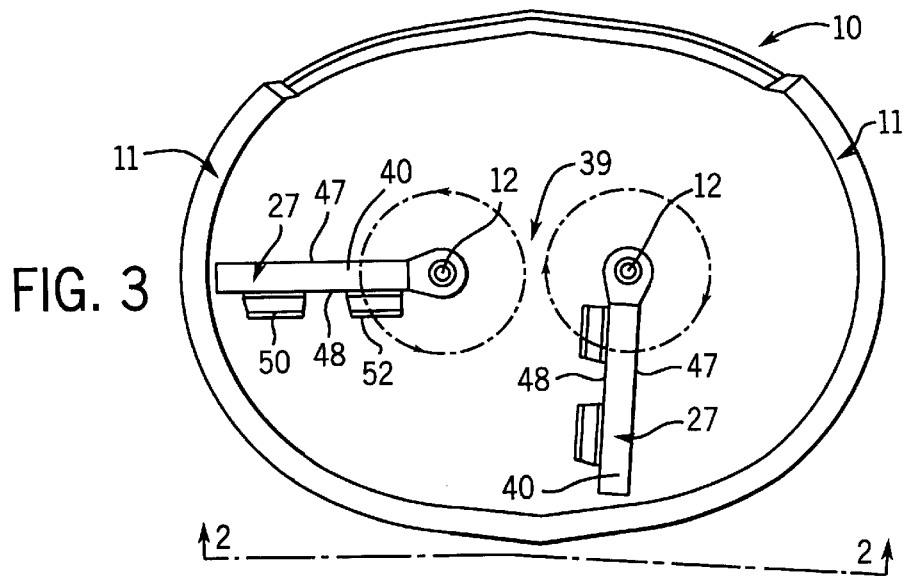
FIGS. 3–5 are end elevation views similar to FIG. 1, but showing the agitator panel orientation and rotation in various positions in accordance with the present invention.

The food processing vat 10 of a type which may be used with the present invention is shown in FIGS. 1 and 2. The vat is completely enclosed and is formed from a pair of curved wall portions 11 which are positioned with their longitudinal axes 12 disposed generally horizontally and in parallel horizontally spaced relation. The axial ends of the wall portions 11 are interconnected and enclosed by flat opposite end walls 13 and the surfaces of the wall portions 11 are interconnected with generally tangentially disposed upper and lower walls 14 and 15, respectively. Thus, the vat 10 has a generally oval cross section when viewed in a plane perpendicular to the axes 12.

As shown, each of the curved wall portions 11 is constructed of a pair of interconnected and oppositely extending frustoconical surface portions 16. The frustoconical surface portions are interconnected along a central circular apex 17 which lies in a plane perpendicular to the axes 12 and defines the region of maximum vat radius with respect to each of the axes 12. Similarly, the upper wall 14 and lower wall 15 each comprise a pair of oppositely sloping planar wall portions 18 interconnected along abutting edges to form central linear ridges 20 interconnecting the circular apices 17 at the top and bottom of the vat. The wall portions 18 also preferably slope in the direction of the central linear ridge 20 to form central lateral ridges 21. This construction is particularly useful for the lower wall 15 where a central apex 22, formed at the intersection of the lower central linear ridge 20 and the lateral ridges 21, provides a convenient position for a drain outlet 23. The vat is mounted on a supporting frame 24 with the central drain outlet 23 establishing the lowermost point of the vat. The supporting frame 24 includes a side frame member 25 which supports a drive mechanism 26 for the vat, as will be described hereinafter.

A pair of agitator panels 27 are rotatably mounted within the vat 10, each panel 27 having its rotational axis coincident with a horizontal axis 12 of one of the compound frustoconical wall portions 11. Each of the panels 27 is constructed of an open framework of intersecting blades comprising generally flat plates. The blades include a number of parallel generally outwardly extending blades 31 and a number of parallel generally longitudinally extending blades 32 which are preferably arranged such that the blades 31 and 32 are respectively non-perpendicular. As shown, the framework of intersecting blades comprises primarily a plurality of frame segments of parallelogram shape. The generally radially extending blades 31 are arranged in a pair of radial blade groups 34 with one of the groups positioned on each side of a central vertical plane perpendicular to the panel axis 12. The radially extending blades 31 of each blade group 34 are set at an acute angle to the vertical central plane and are mutually divergent in a radially outward direction.

The generally axially extending blades 32 include an outermost blade 35 which comprises the radially outer edge of the agitator panel 27 and an innermost blade 36 which comprises the radially inner edge of the panel. A number of intermediate axially extending blades 37 are generally equally spaced between and parallel to the outermost and innermost blades 35 and 36.

The rotating agitator panel 27 is constructed to sweep in closely spaced relation to the frustoconical surface portions 16 of the vat, and also to provide an intersecting overlap in the common volume 39 between axes 12 which is swept by the rotating agitator panels. The outermost and innermost blades 35 and 36, respectively, have a shallow V shape each of which defines a central blade apex 38 which points radially outwardly, allowing the outermost blade 35 to conform closely to the shape of the interior of the frustoconical surface portions 16 of the vat.

Each agitator panel 27 includes a pair of radial support arms 40 by which the panel is mounted for rotation. One end of one of the support arms includes a first hub 41 rotatably supported by a bearing 42 on one of the end walls 13. The end of the other support arm 40 includes a second hub 43 which is rotatably supported to turn in a rotary seal in the other end wall 13 and is also attached to a stub shaft 45 extending from a right angle gear box 46 forming part of the drive mechanism 26. The opposite outer ends of the support arms 40 are secured to the opposite ends of the outermost blade 35. The rotational axes 12 of the agitator panels 27 are spaced horizontally at a distance which is less than the radius of rotation (or the radius of the volume swept) by the panels as they rotate. Therefore, to prevent contact between the rotating panels, the innermost blade 36 is spaced radially from the axis of panel rotation by an amount sufficient to accommodate an overlap in the respective volumes swept by each panel as it rotates beyond the axis of the adjacent panel. As a result, the radially outer edge portion of one panel, defined by the position of the outermost blade 35, will pass during rotation through the space between the innermost blade 36 and rotational axis 12 of the other panel.

In a manner generally similar to prior art cheese processing vats, the agitator panel blades 27 are constructed to provide a cutting function when the panels are rotated in one direction and a stirring function when the panels are rotated in the opposite direction. Thus, each of the blades has a sharp cutting edge 47 on one side of the panel, which cutting edges are preferably coplanar, and a blunt stirring edge 48 on the other side of the panel, which stirring edges may be coplanar, but are not necessarily.

The radially outer ends of alternate radially extending blades 31 and the outer ends of each radial support arm 40 include integral deflector plates 50 each of which includes a face portion 51 bent out of the plane of the blade on which it is formed and disposed at an acute angle with respect thereto. The deflector plates 50 extend from the stirring edge face of the agitator panel 27 and the free edges thereof are blunt in the same manner as the stirring edges 48. A pair of inner deflector plates 52 are also provided on shortened radial blades 53 mounted near the intersections of the radial support arms 40 and the opposite ends of the innermost blade 36.

FIG. 1 shows the mounting and rotational orientation of the agitator panels 27 in accordance with prior art teaching. The panels are mounted to rotate in the same direction as are rotationally oriented in the same position. In this prior art embodiment of the agitator panel orientation, the stirring faces 48 lead as the panels are rotated together in the clockwise direction. It is this mode of operation which tends to cause the curd to be moved toward the left-hand cylindrical section 11 slow from its generally clockwise rotational movement and pile up. The result is that the curd will tend to undesirably mat and, to prevent matting, the rotational speed of the agitator panels must be increased or the rotational direction reversed, both of which are undesirable.

Figure 4:
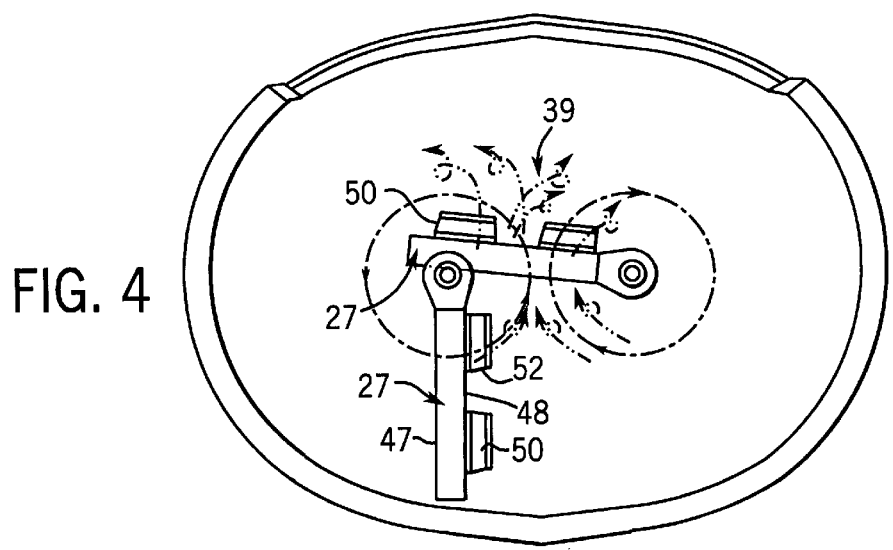
Figure 5:
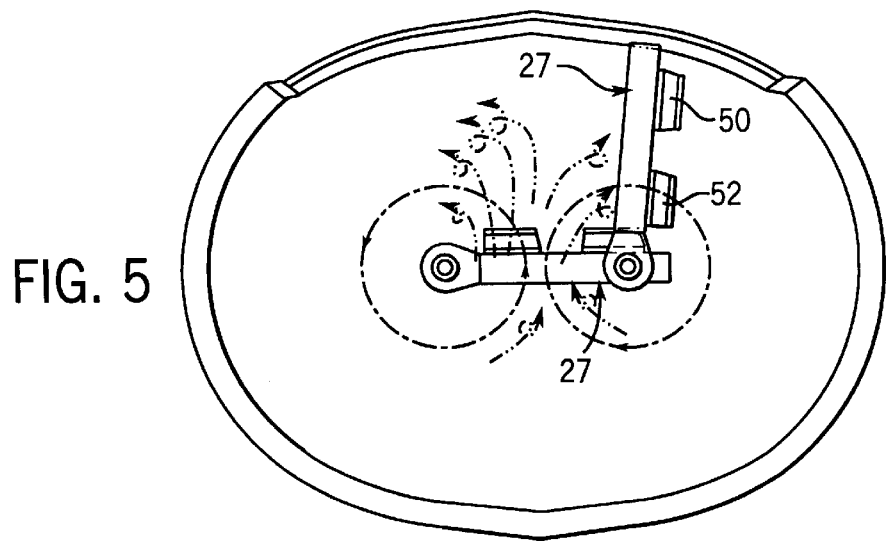

The agitator panel orientation and rotation strategy of the present invention have been found to permit operation of the cheese vat in the stirring mode in a manner which meets the desirable goal of keeping the cheese particles in suspension and evenly distributed throughout the vat at the lowest rotational speed. The key to such improved operation is believed to lie in the unique interaction of the counterrotating agitator panels 27 as they rotate in succession through the common volume of the vat between the rotational axes 12 of the panels. Referring particularly to FIGS. 4 and 5, and without being bound as to any particular theory of operation, it is believed that, as the counterrotating panels rotate vertically upwardly through the common volume 39 between their rotational axes 12, the tangential movement of cheese particles from opposite rotational directions causes the particles to collide, generating a circular vortex motion that imparts lift to the particles. This is shown schematically by the directional arrows showing cheese particle movement in FIGS. 4 and 5. This results in better agitation and more uniform particle distribution at lower rotational speeds. From a cheese product standpoint, the result is higher yield with lower fat loss.

In prior art vats with blade orientation and rotation as shown and discussed with respect to FIG. 1, there is a tendency of the cheese curds to resist the cutting action of the agitator blades by "running away" from the agitator rotation. In accordance with this invention, counterrotation of the agitators helps contain the curd during the cutting operation by providing resistance to curd flow from the opposite agitator movement. This also allows processing at slower agitator speeds and in a shorter time, both of which benefits are highly desirable.

As may be seen in FIGS. 2–5, the agitator panels 27 are rotationally oriented in a manner different from the rotational orientation of the panels in the prior art as shown in FIG. 1 where the panels are identically oriented and rotate in the same direction. In accordance with the present invention, counterrotation of the agitator panels, reverse positioning of the cutting and stirring faces of one panel with respect to the other, and the offset in the relative rotational positions of the panels all serve to distinguish the construction and operation of the subject vat from the prior art and effectively overcome the operational deficiencies in the prior art discussed above. In the drawings of FIGS. 3–5, the agitator panels 27 are mounted to present their stirring faces 48 to lead, as the panels rotate upwardly in close succession through the common volume 39. Conversely, reverse counterrotation in the cutting direction moves the cutting faces 47 of the agitator panels downwardly through the common volume 39. This cutting/stirring strategy is particularly well suited to the processing of low fat cheeses in which the cheese particles typically have a specific gravity greater than 1.0. A particularly attractive feature of the vat of the subject invention, however, is that by simply reversing the mounting of the agitator panels on their rotational axes (such that the cutting faces and the stirring faces move in opposite rotational directions from the example just described) an entirely different processing strategy may be utilized. For example, high fat cheese, typically having a specific gravity less than 1.0, may be more efficiently processed by stirring in a downward direction through the common volume 39 and cutting with agitator panel movement upwardly through the common volume. Prior art horizontal cheese vats utilizing synchronized agitator panel rotation in the same direction are incapable of providing such versatility.

In the particular construction of the vat 10 shown in the drawings, the agitator panels 27 utilize an open framework construction and, because the rotational axes 12 of the panels 27 are spaced horizontally at a distance which is less than the radius of rotation a (the radius of the volume swept), as described in detail above, care must be taken in the rotational mounting of the panels to avoid collision as they counterrotate. In particular, one panel must be set to rotationally lag behind the other, as may best be seen in FIGS. 4 and 5. In FIG. 4 it may be seen that the right hand agitator panel 27 passes through a common volume 39 with a rotational lead over the left-hand agitator by about 87°. Other prior art twin agitator horizontal vats in which the axes of agitator panel rotation are spaced farther apart than the radius of the panel may be operated with a substantially smaller rotational lag in the panels. On the other hand, the lag between the panels could be in excess of 90° and even approach 180°. However, it is believed that some lag in the movement of the agitator panels through the common volume 39 is beneficial because it allows the cheese particles to flow or drift toward the opposite side of the vat and into the path of the following agitator panel.

The deflector plates 50 trail when the agitator panels 27 are being rotated in the cutting direction. Although the movement of the deflector plates through the mass of curds and whey is quite smooth in the cutting direction, the angled offset face portions 51 nevertheless contact the coagulated mass and provide beneficial movement of the mass in both the radial and axial directions. This enhanced movement is particularly important to eliminate tracking of the cutting blades 30 through essentially the same cuts in succeeding revolutions. If tracking occurs, the mass will tend to be cut into narrow slivers instead of the larger and more desirable cubical masses. When rotation of the agitator panels is reversed for stirring, the deflector plates 50 also provide the same dual direction flow in both radial and axial directions to better enhance the uniformity of the cut mass. The cheese is also typically heated during stirring and the unique angled orientation of the deflector plates assists greatly in removing the warmer mass from the heated side walls of the vat and replacing it with cooler mass from the interior.

Substantially the entire vat may be enclosed by an outer wall 54 which defines, with the generally cylindrical wall portions 11, the end walls 13 and the lower wall 15, a heating and cooling jacket 55. The upper wall 14 is not enclosed by the outer wall 54 and this unjacketed area is generally above the level of the liquid and semi-liquid materials being processed. The heating and cooling jacket 55 may be supplied with a cooling fluid, hot water or steam and, by substantially enclosing the entire vat in the heating and cooling jacket 55, combined with the unique radial and axial flow induced by the angled deflector plates 50, most effective and efficient cooking of the cheese mass or other temperature control may be attained. Furthermore, the jacket portions adjacent the end walls 13 may be separated from the jacket portions surrounding the generally cylindrical wall portions, so they may be separately supplied with heating or cooling fluid to provide even greater selectivity in the control of temperature.

The drive mechanism 26 includes an electric motor 56 driving a reducer 57 which, in turn, is coupled to the right angle gear boxes 46 for the stub shafts 45. In addition to variable speed counterrotation of the agitator panels in the cutting and stirring directions, the drive mechanism 26 may be operated to provide a reciprocal or oscillating agitator panel movement to enhance intermediate draw-off of whey during the processing. In particular, the agitator panels may be driven to oscillate through acute angles below the horizontal just sufficient to prevent the mass from matting while surface liquid is drawn off. A strainer apparatus 58 may be operatively attached to the upper wall 14 of the vat to be lowered below the upper level 60 of the whey, while the agitator panels 27 are stationary or are being oscillated in the lower portion of the vat, to permit whey to be drawn off while excluding solids.

I claim:

1. In a cheese processing vat having a pair of interconnected generally cylindrical wall portions with horizontally disposed axes, the axes of the generally cylindrical wall portions positioned in parallel horizontally spaced relation, and common opposite end walls forming with the generally cylindrical wall portions an enclosed vat containing a mixture of cheese curd solids and liquid whey, said vat having a generally oval cross section in a plane perpendicular to said axes, the improvement comprising:

an agitator panel rotatably mounted on the axis of each wall portion to sweep a generally cylindrical volume;

each agitator panel including a cutting face having a plurality of sharp cutting edges disposed in a generally common first plane and an opposite stirring face having a plurality of blunt stirring edges disposed in a generally common second plane;

the axes of rotation of the agitator panels being spaced to provide a common volume between said axes swept by the respective agitator panels;

a drive for rotating said panels in opposite rotational directions through the mixture in the vat such that said panels move through the common volume in the same direction, and means for mounting said panels with the respective cutting and stirring edges oriented such that during rotation only the stirring edges of the panels or only the cutting edges of the panels are moving toward the common volume and such that one of said panels trails the other of said panels during movement through said common volume.

2. The processing vat as set forth in claim 1 wherein said mounting means mounts said panels to present the respective stirring faces in the direction of upward movement through said common volume.

3. The processing vat as set forth in claim 1 wherein each of said agitator panels comprises a framework of intersecting blades including parallel generally radially extending blades and parallel generally axially extending blades, said radially and axially extending blades being respectively non-perpendicular.

4. The processing vat as set forth in claim 3 wherein said intersecting blades comprise generally flat plates each including a cutting edge and an opposite stirring edge.

5. The processing vat as set forth in claim 4 wherein selected ones of said radially extending blades include deflector plates extending from the stirring edges of said blades.

6. The processing vat as set forth in claim 5 wherein said deflector plates include face portions lying in planes disposed at acute angles with respect to the planes of the blades.

7. The processing vat as set forth in claim 1 wherein the axes of rotation of said panels are spaced at a distance less than the radius of the volume swept by the panels to allow a radially outer edge portion of one panel to pass during rotation through said common volume into and through the space between a radially inner edge portion of the outer panel and the axis of rotation of said other panel.

8. The processing vat as set forth in claim 1 wherein said one panel is mounted to rotationally trail the other panel by about 90°.

9. The processing vat as set forth in claim 1 wherein said mounting means mounts said one panel to rotationally trail the other panel by up to about 180°.

10. A method for processing cheese in a vat having a pair of interconnected generally cylindrical wall portions with horizontally disposed axes, the axes of the generally cylindrical wall portions positioned in parallel horizontally spaced relation, and common opposite end walls forming with the generally cylindrical wall portions an enclosed vat having a generally oval cross section in a plane perpendicular to said axes, said method comprising the steps of:

(1) introducing into the vat raw materials for producing a mixture of cheese curd solids and liquid whey;

(2) rotatably mounting an open-framed agitator panel on the axis of each wall portion to sweep a generally cylindrical volume;

(3) spacing the axes of rotation of the panels to provide a common volume between said axes swept by the respective panels;

(4) providing each panel with a cutting face having a plurality of sharp cutting edges disposed in a generally common first plane and an opposite stirring face having a plurality of blunt stirring edges disposed in a generally common second plane;

(5) mounting said panels to present the respective stirring faces in one direction of movement through said common volume and to present the respective cutting faces in the opposite direction of movement through said volume;

(6) driving said panels in opposite rotational directions through the mixture in the vat and causing said panels to move through said common volume in the same direction, wherein only the cutting edges of the panels or only the stirring edges of the panels are moving toward the common volume; and, (7) causing one of said panels to trail the other panel during movement through said common volume.

11. The method as set forth in claim 10 including the steps of providing said mixture with cheese curd solids having a density greater than the liquid whey, and driving said panels to move the stirring edges upwardly through said common volume.

12. The method as set forth in claim 10 including the steps of providing said mixture with cheese curd solids having a density less than the liquid whey, and driving said panels to move the stirring edges downwardly through said common volume.

* * * * *

EX PARTE REEXAMINATION CERTIFICATE (10238th)

United States Patent
Ejnik

(10) Number: US 5,985,347 C1
(45) Certificate Issued: Aug. 1, 2014

(54) CHEESE PROCESSING VAT AND METHOD

(75) Inventor: Stephen J. Ejnik, Eldorado, WI (US)

(73) Assignee: Tetra Laval Holdings & Finance S.A., Pully (CH)

Reexamination Request:
No. 90/012,965, Aug. 30, 2013

Reexamination Certificate for:
Patent No.: 5,985,347
Issued: Nov. 16, 1999
Appl. No.: 09/047,708
Filed: Mar. 25, 1998

(51) Int. Cl.
*A01J 25/06* (2006.01)
*A01J 25/00* (2006.01)
*B01F 15/00* (2006.01)
*B01F 7/00* (2006.01)

(52) U.S. Cl.
CPC ............. *A01J 25/06* (2013.01); *B01F 7/00583* (2013.01)

USPC ................. 426/519; 99/462; 99/466; 241/98; 241/101.1; 366/297; 366/300; 366/325.1; 426/582

(58) Field of Classification Search
None
See application file for complete search history.

(56) References Cited

To view the complete listing of prior art documents cited during the proceeding for Reexamination Control Number 90/012,965, please refer to the USPTO's public Patent Application Information Retrieval (PAIR) system under the Display References tab.

*Primary Examiner* — Sean E Vincent

(57) ABSTRACT

A cheese processing vat of the type having a pair of interconnected generally cylindrical wall portions with agitator panels rotating therein to sweep generally cylindrical volumes includes agitator panels which are driven to rotate in opposite directions such that the panels move through a common swept volume between their axes of rotation in the same direction. The panels are mounted such that one panel leads the other during movement through the common swept volume.

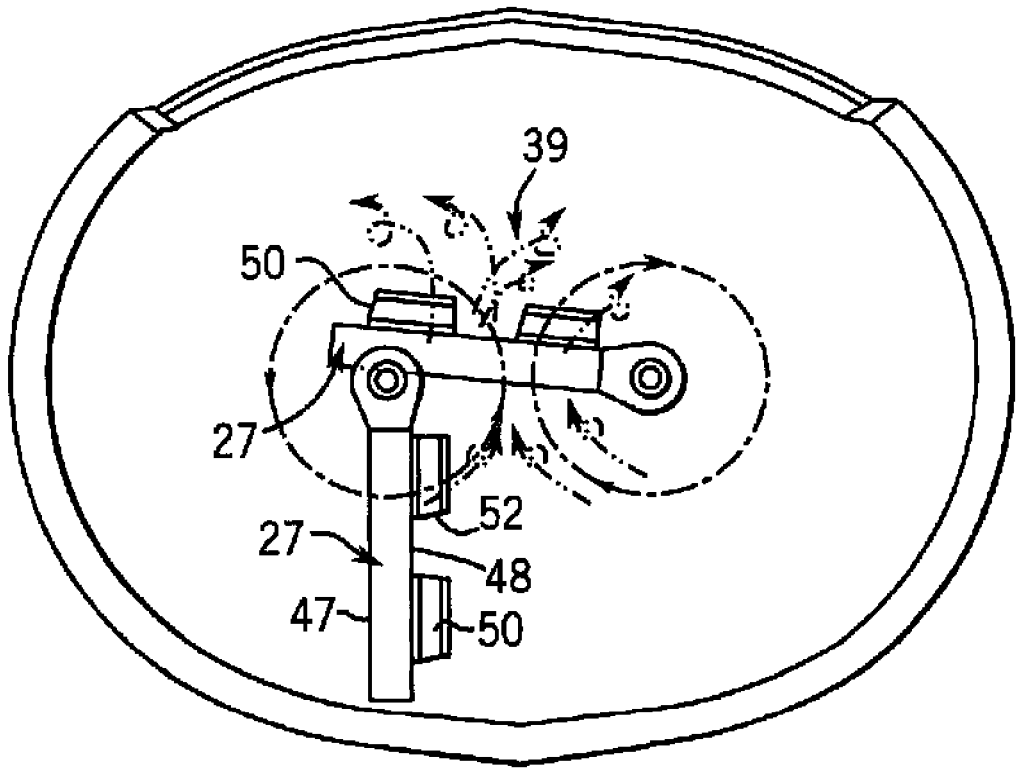

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-12 is confirmed.

* * * * *